US012607323B2

(12) United States Patent
Noda

(10) Patent No.: US 12,607,323 B2
(45) Date of Patent: Apr. 21, 2026

(54) LIGHT EMITTING EMBLEM

(71) Applicant: TOYODA GOSEI CO., LTD., Kiyosu (JP)

(72) Inventor: Yoshihide Noda, Aichi (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 0 days.

(21) Appl. No.: 19/303,979

(22) Filed: Aug. 19, 2025

(65) Prior Publication Data

US 2026/0085806 A1 Mar. 26, 2026

(30) Foreign Application Priority Data

Sep. 26, 2024 (JP) ................................. 2024-167375

(51) Int. Cl.
| | |
|---|---|
| *F21W 104/00* | (2018.01) |
| *B60R 13/00* | (2006.01) |
| *F21S 43/14* | (2018.01) |
| *F21S 43/20* | (2018.01) |
| *F21S 43/40* | (2018.01) |
| *F21Y 115/10* | (2016.01) |

(52) U.S. Cl.
CPC ....... *F21S 43/26411* (2024.05); *B60R 13/005* (2013.01); *F21S 43/14* (2018.01); *F21S 43/40* (2018.01); *F21W 2104/00* (2018.01); *F21Y 2115/10* (2016.08)

(58) Field of Classification Search
CPC ...... F21S 43/26411; F21S 43/14; F21S 43/40; B60R 13/005; F21W 2104/00; F21Y 2115/10
See application file for complete search history.

(56) References Cited

U.S. PATENT DOCUMENTS

| | | | | |
|---|---|---|---|---|
| 5,806,957 | A * | 9/1998 | Prior ....................... | G09F 21/04 |
| | | | | 362/267 |
| 2017/0355302 | A1* | 12/2017 | Kuramitsu ............. | G02B 6/002 |
| 2018/0274745 | A1* | 9/2018 | Nykerk ................. | G02B 3/0062 |
| 2021/0054983 | A1* | 2/2021 | Buschmann ............. | B60Q 1/28 |
| 2024/0263758 | A1* | 8/2024 | Noda .................... | B60R 13/005 |

FOREIGN PATENT DOCUMENTS

JP 2018-185953 A 11/2018

* cited by examiner

*Primary Examiner* — Evan P Dzierzynski

(74) *Attorney, Agent, or Firm* — Posz Law Group, PLC

(57) ABSTRACT

A light emitting emblem includes: a housing; an outer lens having a design of the emblem on a surface of the outer lens, as defined herein; a light emitting element as a light source accommodated in a space sealed by the housing and the first portion of the outer lens; and an inner lens provided between the first portion of the outer lens and the light emitting element in the space, as defined herein, light emitted in a direction of the optical axis of the light emitting element and totally reflected by the reflective surface of the inner lens enters the outer lens without being blocked by the housing, and travels to the second portion, and light emitted from the light emitting element is extracted from the surface of the outer lens, whereby the design of the emblem emits light.

6 Claims, 4 Drawing Sheets

LIGHT EMITTING EMBLEM

CROSS-REFERENCE TO RELATED APPLICATION

This application is based on and claims priority under 35 USC 119 from Japanese Patent Application No. 2024-167375 filed on Sep. 26, 2024.

TECHNICAL FIELD

The present invention relates to a light emitting emblem, and more particularly to a light emitting emblem to be provided to a vehicle such as an automobile.

BACKGROUND ART

In the conventional art, a light emitting emblem is known in which a space is formed by a housing and an outer lens, and in which an LED of a light source and an inner lens are accommodated in the space (see Patent Literature 1).

In the light emitting emblem described in Patent Literature 1, light emitted from the LED and entering the plate-shaped inner lens travels in the inner lens in the in-plane direction and is reflected upward by the unevenness of the lower surface of the inner lens. Then, the light emitted upward from the inner lens passes through the outer lens and is emitted to the outside of the light emitting emblem, and the emblem emits light.

Patent Literature 1: JP2018-185953A

SUMMARY OF INVENTION

However, according to the light emitting emblem described in Patent Literature 1, since the light emitting region of the surface of the outer lens having the design of the emblem is limited to the region located substantially directly above the inner lens, when the outer lens extends to the outside of the housing, the entire emblem cannot efficiently emit light.

An object of the present invention is to provide a light emitting emblem in which an outer lens having a design of the emblem on the surface of the outer lens extends to the outside of a housing, and in which the entire design of the emblem can efficiently emit light.

In order to achieve the above object, an aspect of the present invention provides the following light emitting emblem.

(1) A light emitting emblem including: a housing; an outer lens having a design of the emblem on a surface of the outer lens, the outer lens including a first portion covering an opening of the housing so as to seal an inside of the housing and a second portion not overlapping the housing; a light emitting element as a light source accommodated in a space sealed by the housing and the first portion of the outer lens; and an inner lens provided between the first portion of the outer lens and the light emitting element in the space, the inner lens having, on an upper surface of the inner lens, a reflective surface inclined with respect to an optical axis of the light emitting element, in which light emitted in an optical axis direction of the light emitting element and totally reflected by the reflective surface of the inner lens enters the outer lens without being blocked by the housing, and travels to the second portion, and in which light emitted from the light emitting element is extracted from the surface of the outer lens, whereby the design of the emblem emits light.

(2) The light emitting emblem according to (1) described above, in which the reflective surface is provided in multiple stages in the inner lens.

(3) The light emitting emblem according to (1) or (2) described above, in which light emitted in the optical axis direction of the light emitting element and entering the outer lens is totally reflected by a side surface of the outer lens that the light reaches first.

(4) The light emitting emblem according to (1) or (2) described above, in which a height of an upper end of the reflective surface with respect to a bottom portion of the housing is larger than a height of an upper end of the housing and a height of a lower surface of the second portion of the outer lens.

According to the present invention, it is possible to provide a light emitting emblem in which an outer lens having a design of the emblem on the surface of the outer lens extends to the outside of a housing, and in which the entire design of the emblem can efficiently emit light.

DESCRIPTION OF EMBODIMENTS (Configuration of Light Emitting Emblem)

Figure 1:
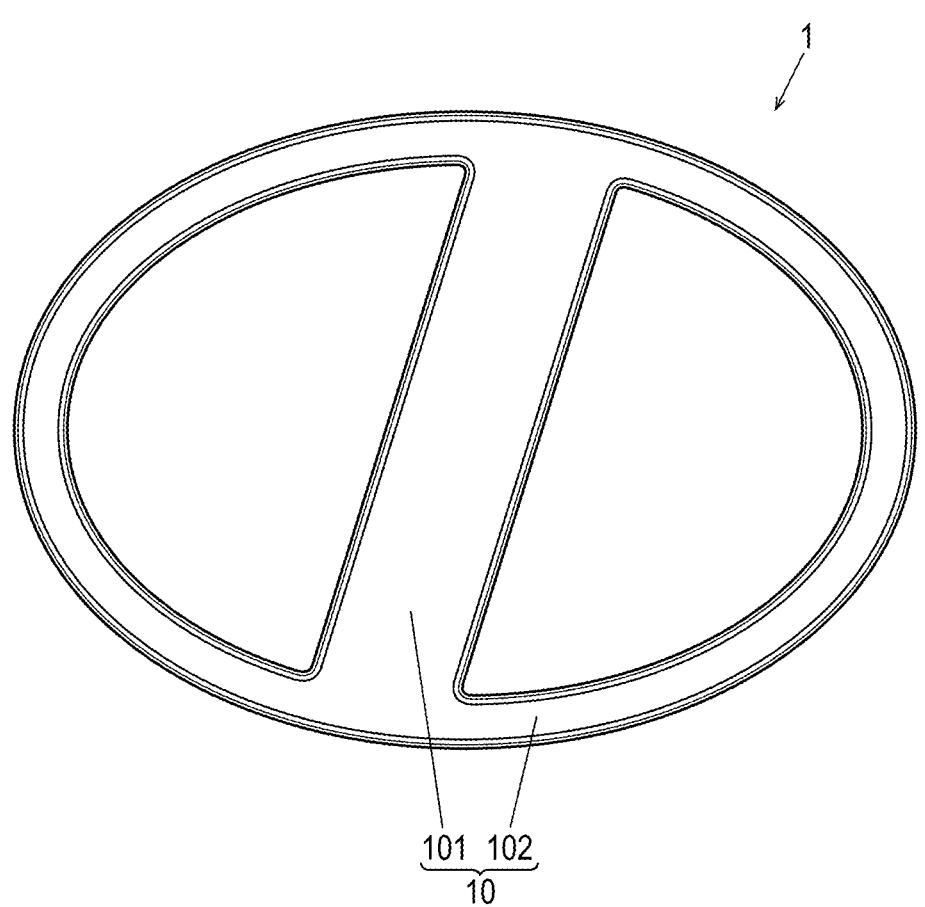
FIG. 1 is a plan view of a light emitting emblem according to an embodiment of the present invention.
Figure 2A:
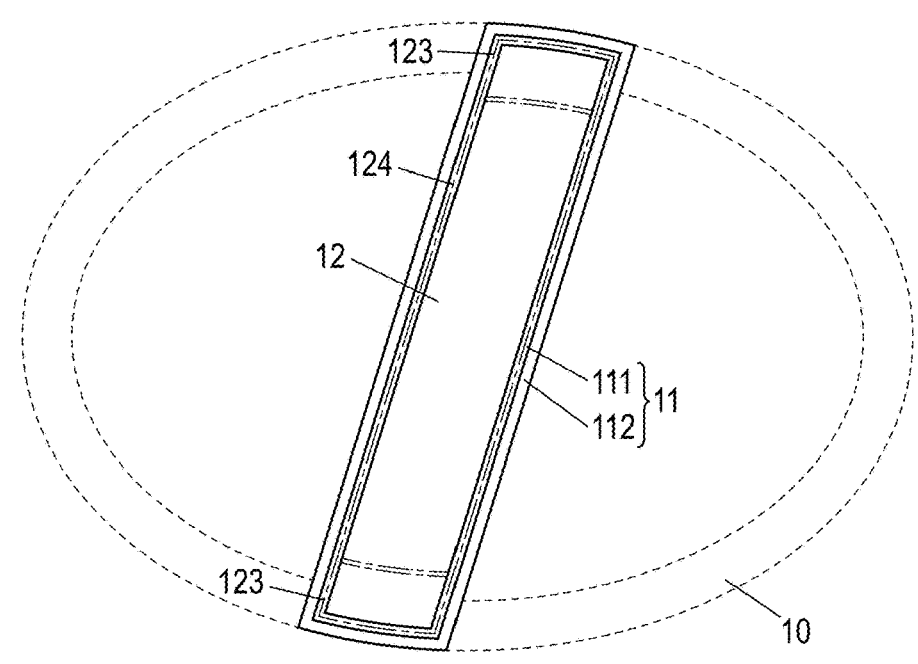
FIG. 2A is a plan view of the light emitting emblem in a state in which an outer lens is removed.
Figure 2B:
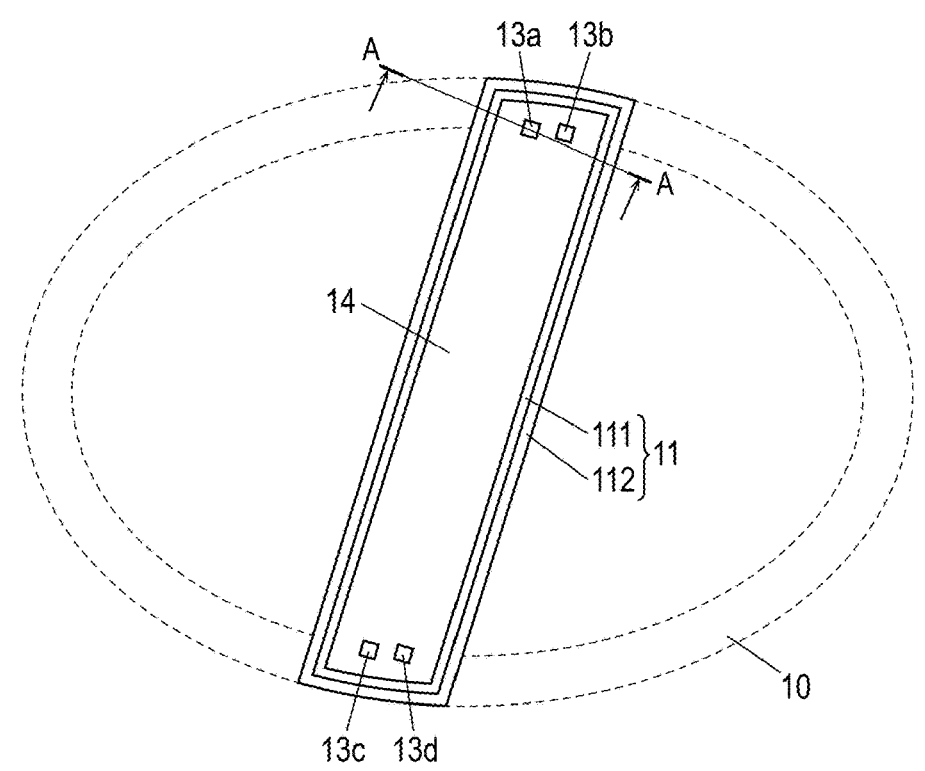
FIG. 2B is a plan view of the light emitting emblem in a state in which the outer lens and an inner lens are removed.

FIG. 1 is a plan view of a light emitting emblem 1 according to an embodiment of the present invention. FIG. 2A is a plan view of the light emitting emblem 1 in a state in which an outer lens 10 is removed. FIG. 2B is a plan view of the light emitting emblem 1 in a state in which the outer lens 10 and an inner lens 12 are removed.

The light emitting emblem 1 includes a housing 11, an outer lens 10 having a design (in the example shown in FIG. 1, a mark formed by a combination of an elliptical frame and an I shape) of the emblem on the surface (the surface facing the front surface in FIG. 1), the outer lens 10 including a first portion 101 covering the opening of the housing 11 so as to seal the inside of the housing 11 and a second portion 102 not overlapping the housing 11, a light emitting element 13 (13a to 13d) as a light source that is accommodated in a space sealed by the housing 11 and the first portion 101 of the outer lens 10, and an inner lens 12 that is provided between the first portion 101 of the outer lens 10 and the light emitting element 13 in the space sealed by the housing 11 and the first portion 101 of the outer lens 10 and that has a reflective surface 121 inclined with respect to the optical axis of the light emitting element 13 on the upper surface.

In the light emitting emblem 1, light emitted from the light emitting element 13 is extracted from the surface of the outer lens 10, so that the design of the emblem emits light.

Figure 3A:
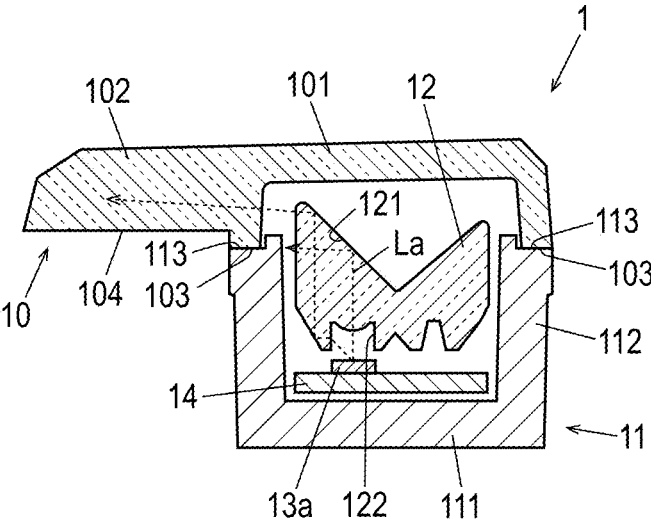
FIGS. 3A and 3B are cross-sectional views showing examples of vertical cross sections of the light emitting emblem cut along a cutting line A-A shown in FIG. 2B.
Figure 3B:
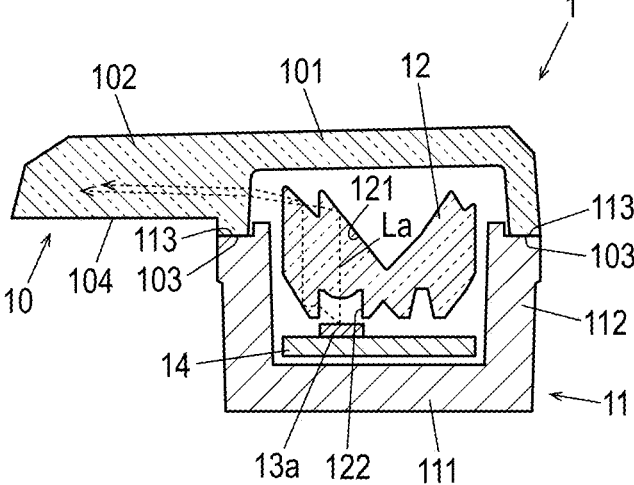

FIGS. 3A and 3B are cross-sectional views showing examples of vertical cross sections of the light emitting emblem 1 cut along a cutting line A-A shown in FIG. 2B.

As shown in FIGS. 3A and 3B, in the light emitting emblem 1, the light emitted upward from the light emitting element 13 is reflected by the inner lens 12 in the lateral direction (the lateral direction in FIGS. 3A and 3B) and guided in the planar outer lens 10 in the in-plane direction. Accordingly, the entire surface of the outer lens 10 including the first portion 101 and the second portion 102, that is, the entire design of the emblem can emit light.

More specifically, most of the light emitted from the light emitting element 13 enters the inside of the inner lens 12 from the inside of a circular groove 122 formed in the lower surface of the inner lens 12, is reflected by the reflective surface 121 which is the inclined upper surface of the inner lens 12, and is directed to the outer lens 10.

In the light emitting emblem 1, in order to efficiently cause the entire surface of the outer lens 10 to emit light, light $L_a$ emitted in the optical axis direction of the light emitting element 13 is totally reflected by the reflective surface 121 of the inner lens 12, and the light L totally reflected by the reflective surface 121 enters the outer lens 10 without being blocked by the housing 11 and travels to the second portion 102.

Here, the optical axis of the light emitting element 13 is an axis extending from the center of the light emitting element 13 perpendicularly to the surface on which the light emitting element 13 is provided. The light $L_a$ emitted in the optical axis direction of the light emitting element 13 is the strongest light of the light emitted from the light emitting element 13. Therefore, in order to efficiently cause the entire surface of the outer lens 10 to emit light, the light $L_a$ emitted in the optical axis direction is required to enter the outer lens 10 without being blocked by the housing 11 and travel to the second portion 102.

FIG. 3A shows a structure as a comparative example in which the light $L_a$ emitted in the optical axis direction of the light emitting element 13 is blocked by the housing 11. In the structure shown in FIG. 3A, the light $L_a$ totally reflected by the reflective surface 121 of the inner lens 12 is blocked by the upper portion of a side wall portion 112 of the housing 11.

On the other hand, FIG. 3B shows a structure in which the light $L_a$ emitted in the optical axis direction of the light emitting element 13 enters the outer lens 10 without being blocked by the housing 11. As shown in FIG. 3B, in the inner lens 12, the reflective surfaces 121 that reflect light emitted from the light emitting element 13 toward the second portion 102 of the outer lens 10 are preferably provided in multiple stages (two stages in FIG. 3B).

When the reflective surfaces 121 are provided in multiple stages, the height of the point that reflects the light emitted from the light emitting element 13 can be increased as a whole. For example, when the light reflected by the reflective surface 121 travels in the horizontal direction, the light can enter the outer lens 10 without being blocked by the housing 11 if the point at which the reflective surface 121 reflects the light is located at a position higher than the upper end of the side wall portion 112 of the housing 11. In this way, when the reflective surfaces 121 are provided in multiple stages, the light emitted from the light emitting element 13 including the light $L_a$ can be efficiently guided to the second portion 102 of the outer lens 10.

In the light emitting emblem 1, it is preferable that the light $L_a$ emitted in the optical axis direction of the light emitting element 13 and entering the outer lens 10 is totally reflected by the side surface of the outer lens 10 that the light reaches first.

Figure 4A:
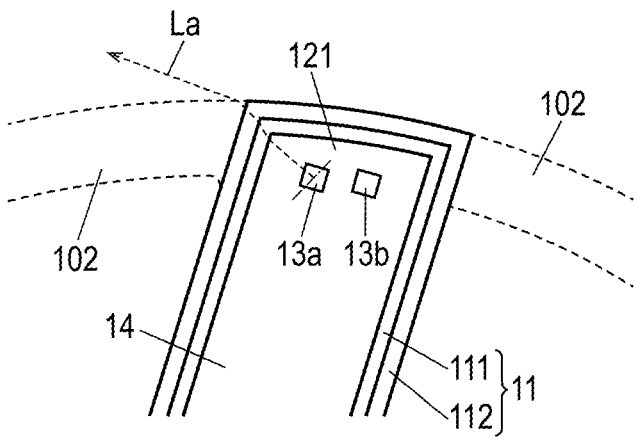
FIGS. 4A and 4B are enlarged views of a part of FIG. 2B, to which an angle of the reflective surface of the inner lens in the plan view and a path of light emitted from a light emitting element in the optical axis direction and reflected by a reflective surface are added.
Figure 4B:
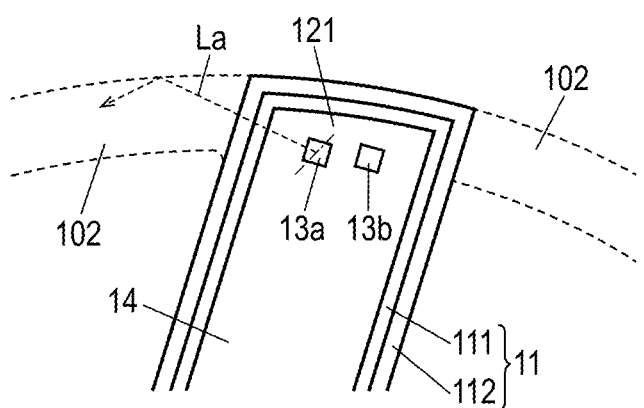

FIGS. 4A and 4B are enlarged views of a part of FIG. 2B, to which an angle of the reflective surface 121 of the inner lens 12 in the plan view and a path of the light $L_a$ emitted from the light emitting element 13 in the optical axis direction and reflected by the reflective surface 121 are added.

FIG. 4A shows, as a comparative example, a structure in which a part of the light $L_a$ emitted in the optical axis direction of the light emitting element 13 and entering the outer lens 10 is emitted to the outside without being reflected by the side surface of the outer lens 10 that the light reaches first. In the structure shown in FIG. 4A, a part of the light $L_a$ totally reflected by the reflective surface 121 of the inner lens 12 is emitted to the outside from the side surface of the second portion 102 of the inner lens 12 that the light reaches first.

On the other hand, FIG. 4B shows a structure in which the light $L_a$ emitted in the optical axis direction of the light emitting element 13 and entering the outer lens 10 is totally reflected by the side surface of the outer lens 10 that the light reaches first. In the structure shown in FIG. 4B, the light $L_a$ totally reflected by the reflective surface 121 of the inner lens 12 is totally reflected by the side surface of the second portion 102 of the inner lens 12 that the light reaches first, and propagates inside the second portion 102.

In the structure shown in FIG. 4A and the structure shown in FIG. 4B, the reflective surface 121 of the inner lens 12 has different angles in the plan view. In this way, by adjusting the angle of the reflective surface 121 of the inner lens 12 in the plan view, the light $L_a$ can be totally reflected by the side surface of the outer lens 10 that the light reaches first.

Although FIGS. 3A, 3B, 4A, and 4B show paths of light emitted from a light emitting element 13a among the light emitting elements 13, for light emitting elements 13b to 13d, light is similarly reflected by the reflective surface 121, which is the inclined upper surface of the inner lens 12, enters the outer lens 10, and travels to the second portion 102.

As shown in FIG. 4B, the light emitted from the light emitting element 13a and reflected by the reflective surface 121 mainly travels to the left side in the upper portion of the annular portion of the emblem in the plan view, and the light emitted from the light emitting element 13b and reflected by the reflective surface 121 mainly travels to the right side in the upper portion of the annular portion of the emblem in the plan view. The light emitted from the light emitting element 13c and reflected by the reflective surface 121 mainly travels to the left side in the lower portion of the annular portion of the emblem in the plan view, and the light emitted from the light emitting element 13d and reflected by the reflective surface 121 mainly travels to the right side in the lower portion of the annular portion of the emblem in the plan view.

Similarly to the light $L_a$ emitted in the optical axis direction of the light emitting element 13a, the light $L_a$ emitted in the optical axis direction of the light emitting elements 13b to 13d enters the outer lens 10 without being blocked by the housing 11. Similarly to the light $L_a$ emitted in the optical axis direction of the light emitting element 13a, the light $L_a$ emitted in the optical axis direction of the light emitting elements 13b to 13d is preferably totally reflected by the side surface of the outer lens 10 that the light reaches first.

5

The housing 11 includes a bottom portion 111 facing the first portion 101 of the outer lens 10 and the side wall portion 112 extending from the side portion of the bottom portion 111 in the thickness direction of the light emitting emblem 1.

The housing 11 includes, on the back surface, a fixing portion to fix the housing 11 to an attachment target of the light emitting emblem 1 such as a front grille of a vehicle. The housing 11 can be fixed to the attachment target of the light emitting emblem 1 by, for example, tightening a screw through a screw fastening hole formed in the fixing portion. The housing 11 may have a structure for pulling out a cable connected to a printed circuit board 14 to the outside.

An upper surface 113 of the side wall portion 112 surrounding the opening of the housing 11 is in close contact with the lower surface of the outer lens 10 and is bonded thereto by welding or the like. Accordingly, the space surrounded by the housing 11 and the outer lens 10 and accommodating the light emitting element 13 and the like is sealed, and it is possible to prevent moisture and the like from entering from the outside.

When a region bonded to the upper surface 113 of the side wall portion 112 of the housing 11 on the lower surface of the outer lens 10 is defined as a bonding surface 103, a portion having the bonding surface 103 of the outer lens 10 as a lower surface and a portion inside the portion having the bonding surface 103 as a lower surface are the first portion 101, and a portion outside the portion having the bonding surface 103 as a lower surface is the second portion 102.

The housing 11 is made of, for example, acrylonitrile-styrene-acrylic acid ester (ASA), acrylonitrile-butadiene-styrene (ABS)+polycarbonate (PC), or acrylonitrile-ethylene-propylene-diene-styrene (AES).

The light emitting element 13 is a light emitting element mounted on the printed circuit board 14, and typically an LED is used. The printed circuit board 14 is fixed to the bottom portion 111 of the housing 11 such that the surface on which the light emitting element 13 is mounted faces the outer lens 10.

The first portion 101 and the second portion 102 of the outer lens 10 are continuous with each other, and light propagating inside the first portion 101 and the second portion 102 can travel back and forth. In the example shown in FIG. 1, an I-shaped portion passing through the center of the emblem is the first portion 101, and a portion not overlapping the I-shaped portion of the ring-shaped portion including the outer edge of the emblem is the second portion 102.

The outer lens 10 has unevenness (for example, dot-shaped recesses) for reflecting light to the front surface side on the lower surface of the outer lens 10, that is, a surface opposite to the surface having the design of the emblem.

The outer lens 10 is made of, for example, a resin such as methyl methacrylate (PMMA) or PC that transmits light emitted from the light emitting element 13. The outer lens 10 may contain a diffusing material such as $TiO_2$ particles in order to improve the uniformity of light extracted from the surface thereof.

The inner lens 12 is made of, for example, a resin such as PMMA or PC that transmits light emitted from the light emitting element 13.

The inner lens 12 has the reflective surface 121 for reflecting the light emitted from the light emitting element 13 toward the outer lens 10 in a portion 123 located above the light emitting element 13.

In the light emitting emblem 1, the height of the upper end of the reflective surface 121 with respect to the bottom portion 111 of the housing 11 is usually larger than the height of the upper end (the upper end of the side wall portion 112) of the housing 11 and the height of a lower surface 104 of the plate-shaped second portion 102 of the outer lens 10 in order to reflect light in the lateral direction (the lateral direction in FIGS. 3A and 3B) by the reflective surface 121 and cause the light to enter the outer lens 10.

As described above, the inner lens 12 takes in the light from the light emitting element 13 at the portion 123 located above the light emitting element 13, and reflects the light toward the second portion 102 of the outer lens 10 by the reflective surface 121.

On the other hand, a part of the light taken into the inner lens 12 propagates inside the inner lens 12 without traveling toward the second portion 102 of the outer lens 10, is emitted from the upper surface (the surface on the outer lens 10 side) of the inner lens 12, passes through the first portion 101 of the outer lens 10, and is extracted to the outside. Accordingly, the first portion 101 (the I-shaped portion in FIG. 1) of the outer lens 10 emits light.

The inner lens 12 has unevenness (for example, a linear recess) for reflecting light to the first portion 101 side of the outer lens 10 on the lower surface of a portion 124 other than the portion 123 for taking in the light from the light emitting element 13, that is, the surface on the bottom portion 111 side of the housing 11.

Effects of Embodiment

In the light emitting emblem 1 according to the embodiment of the present invention described above, of the light emitted from the light emitting element 13, reflected by the inner lens 12, and traveling toward the second portion 102 of the outer lens 10, the light blocked by the side wall portion 112 of the housing 11 is reduced, and the light is efficiently transmitted to the second portion 102. Therefore, it is possible to prevent a decrease in the light emission intensity of the second portion 102.

That is, according to the embodiment of the present invention described above, it is possible to provide the light emitting emblem 1 in which the outer lens 10 having a design of the emblem on the surface of the outer lens 10 extends to the outside of the housing 11, and the in which entire design of the emblem can efficiently emit light.

Although the embodiment of the present invention has been described above, the present invention is not limited to the embodiment described above, and various modifications can be made without departing from the gist of the invention. Constituent elements according to the embodiment described above can be freely combined without departing from the gist of the invention. The embodiment described above does not limit the invention according to the scope of the claims. It should be noted that all combinations of the features described in the embodiment are not necessarily essential to the solution of the invention.

REFERENCE SIGNS LIST

1: light emitting emblem
10: outer lens
101: first portion
102: second portion
11: housing
111: bottom portion
112: side wall portion
12: inner lens
121: reflective surface

13: light emitting element

14: printed circuit board

What is claimed is:

1. A light emitting emblem comprising:

a housing;

an outer lens having a design of the emblem on a surface of the outer lens, the outer lens including a first portion covering an opening of the housing so as to seal an inside of the housing and a second portion not overlapping the housing;

a light emitting element as a light source accommodated in a space sealed by the housing and the first portion of the outer lens; and an inner lens provided between the first portion of the outer lens and the light emitting element in the space, the inner lens having, at an upper surface of the inner lens, a reflective surface inclined with respect to an optical axis of the light emitting element, wherein light emitted in a direction of the optical axis of the light emitting element and totally reflected by the reflective surface of the inner lens enters the outer lens without being blocked by the housing, and travels to the second portion, and wherein light emitted from the light emitting element is extracted from the surface of the outer lens, whereby the design of the emblem emits light.

2. The light emitting emblem according to claim 1, wherein the reflective surface is provided in multiple stages in the inner lens.

3. The light emitting emblem according to claim 2, wherein a height of an upper end of the reflective surface measured with respect to a bottom portion of the housing is larger than a height of an upper end of the housing and a height of a lower surface of the second portion of the outer lens.

4. The light emitting emblem according to claim 1, wherein the light emitted in the direction of the optical axis of the light emitting element and entering the outer lens is totally reflected by a side surface of the outer lens that the light reaches first.

5. The light emitting emblem according to claim 2, wherein the light emitted in the direction of the optical axis of the light emitting element and entering the outer lens is totally reflected by a side surface of the outer lens that the light reaches first.

6. The light emitting emblem according to claim 1, wherein a height of an upper end of the reflective surface measured with respect to a bottom portion of the housing is larger than a height of an upper end of the housing and a height of a lower surface of the second portion of the outer lens.

* * * * *